United States Patent
Shogren

[11] 4,067,640
[45] Jan. 10, 1978

[54] APPARATUS FOR SYNCHRONOUSLY SCANNING A FLAT PLATEN WITH A ROTATING MIRROR

[75] Inventor: David K. Shogren, Ontario, N.Y.

[73] Assignee: Xerox Corporation, Stamford, Conn.

[21] Appl. No.: 691,069

[22] Filed: May 28, 1976

[51] Int. Cl.² .................. G02B 27/17; G03B 27/70
[52] U.S. Cl. .................................... 350/6; 355/8; 355/66
[58] Field of Search ............... 350/6, 7, 285; 178/7.6; 355/8, 66

[56] References Cited
U.S. PATENT DOCUMENTS 3,814,494  6/1974  Shiragai et al. .................. 350/285

Primary Examiner—Jon W. Henry
Attorney, Agent, or Firm—Robert J. Bird

[57] ABSTRACT

A flat platen, rotating mirror scanning system is disclosed in which the angular velocity of the rotating mirror is continually varied from end to middle to end of scan to effect a constant speed of scan across the platen surface. This is achieved by providing a mirror drive arrangement which is the mechanical analog of the optical geometry. Conjugate distance changes inherent in flat platen scanning are compensated by a stationary "half-lens" adjacent to the rotating mirror.

1 Claim, 6 Drawing Figures

APPARATUS FOR SYNCHRONOUSLY SCANNING A FLAT PLATEN WITH A ROTATING MIRROR

BACKGROUND AND SUMMARY OF THE INVENTION

This invention relates to optical scanning of a stationary surface with a rotating mirror. A typical environment where the invention might be used is in a photocopying apparatus in which an original object lies on a flat platen for scanning and image projection by a rotating mirror.

There are three general types of strip scanning arrangements known to the prior art. In one, the optical system is fixed and the object and photoreceptor move relative to the optics. In the second, the object is fixed and the optical system and photoreceptor move at appropriate speeds relative to it. In the third, the object is fixed and is scanned by a rotating mirror to relay an image of the object onto a moving photoreceptor. It is this third type system to which the present invention is directed.

Typically, in the prior art, rotating mirror systems have required a curved platen on which to support the object to be copied. The radius of curvature of the platen is equal to the platen-mirror axis distance in order to maintain constant the object conjugate distance as has generally been required by the optics.

It is desired for reasons of economy and utility to provide a mirror scanning system in which a flat platen may be used instead of the prior art curved platen. The problems inherent in scanning a flat platen with a rotating mirror include the optical problem of maintaining a constant object conjugate distance while scanning and the mechanical problem of scanning the object platen at a constant speed so as to "lay down" an image in synchronism on a photoreceptor which is moving at a constant surface speed.

Accordingly, it is an object of this invention to provide a flat platen, rotating mirror scanning system in which the object plane is scanned by the rotating mirror at a constant scan velocity.

Another object is to provide such a system in which object and image conjugate distances are held in constant proportion, e.g. 1:1.

Briefly, this invention is practiced by a flat platen, rotating mirror scanning system in which the angular velocity of the rotating mirror is continually varied from end to middle to end of scan to effect a constant speed of scan across the platen surface. This is achieved by providing a mirror drive arrangement which is the mechanical analog of the optical geometry. Conjugate distance changes inherent in flat platen scanning are compensated by a stationary "half-lens" adjacent to the rotating mirror.

DRAWING

DESCRIPTION

Figure 1:
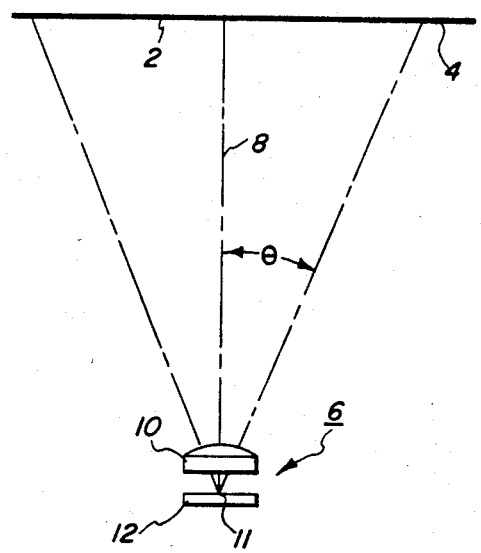
FIG. 1 is an optical diagram of an object and image plane with associated reflector lens in a flat platen scanning system.

Referring now to FIG. 1, a flat object plane and image plane are indicated at 2 and 4 respectively, and are disposed in respective conjugate relationship to a reflector lens, generally indicated at 6, which is located on a central axis 8 and includes a "half-lens" 10 and a lens reflector 12 located adjacent to and behind the lens 10. Reflector 12 is rotatable about an axis 11 which lies in the plane of the mirror and extends normal to the drawing. As is known, a reflector lens is effective to project an image at the image plane 4 from an object disposed at the object plane 2.

Figure 2:
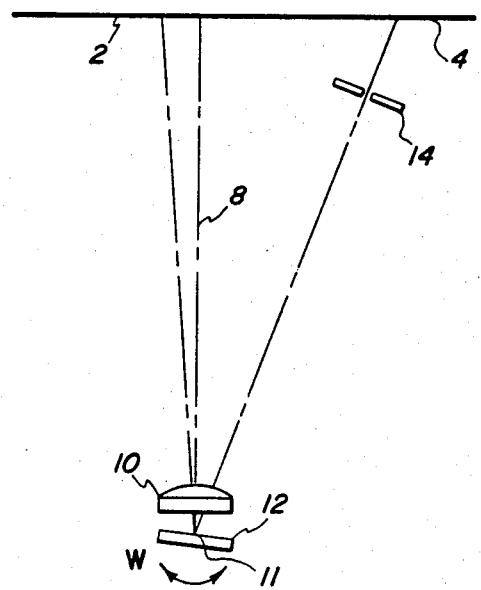
FIG. 2 is an optical diagram similar to FIG. 1 showing the system at an intermediate scan position.

Referring now to FIG. 2, the same structure is shown and further includes an image slit 14. In this view, lens reflector 12 is shown rotated on its axis 11 by a certain angle so as to effect the scanning of object plane 2 and the projection of an image therefrom through the image slit 14 and onto a narrow portion of image plane 4. It is noted here that while lens reflector 12 rotates through a scan angle, the half lens 10 itself does not rotate with the reflector.

Figure 3:
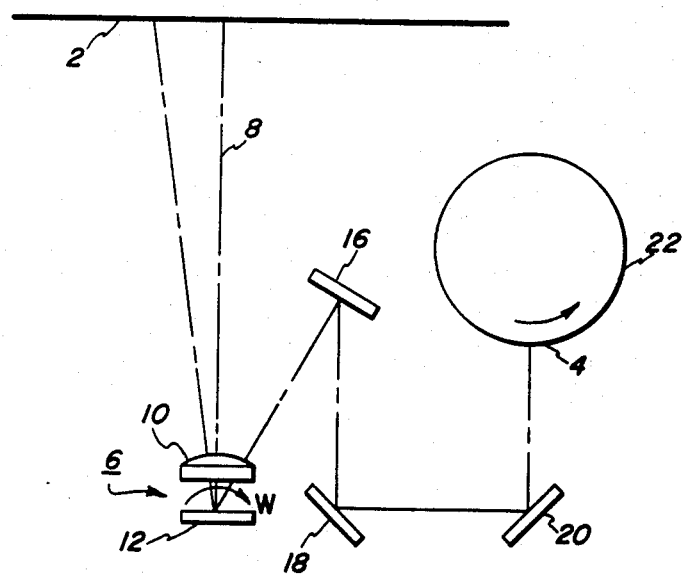
FIG. 3 is an optical diagram showing the scanning system of FIG. 1 in a real photocopying environment.

Referring now to FIG. 3, the scanning system shown in essence in FIGS. 1 and 2 is shown in a real environment which again includes an object plane or platen 2 with a half lens 10 and associated reflector 12 disposed relative to the object 2 on central axis 8. Suitable stationary reflectors 16, 18, and 20 are disposed in the optical path between the reflector lens 6 and the image plane 4, which is here shown on a rotatable photoreceptor drum 22. The system is represented in FIG. 3 at a single instantaneous scan position. In scanning from left to right across the object plane 2, the rotating lens reflector 12 and the stationary half lens 10 project a flowing image through a slit at the image plane 4 and onto the moving photoreceptor 22. The variation in physical distance, during scan, from object plane 2 to reflector 12 is inherently compensated by the reflector lens so that the optical path length of object and image conjugates remain equal (or at such other proportion as may be required if the system is in a magnification made of operation).

Figure 4:
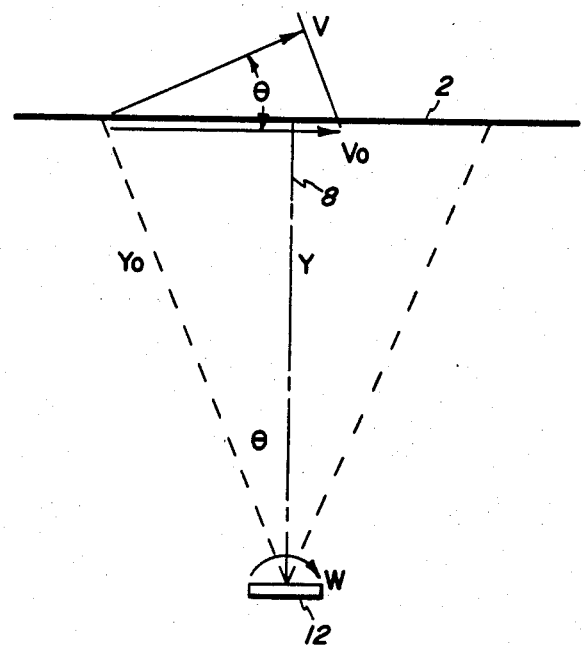
FIG. 4 is a diagram illustrating scan system geometry for the purpose of developing certain mathematical relationships in aid of understanding this invention.

When a rotatable mirror of constant angular velocity scans a flat platen, as represented in FIG. 4 for example, the scan speed at the platen 2 varies continuously from the end to the middle to the other end of the scan. The relationship that expresses the velocity of scan along the platen at any instant is as follows:

$$V_o = (w\ Y)/(\cos^2 \theta) \tag{1}$$

wherein:
$V_o$ = velocity of scan along object (platen)
$Y$ = normal platen to mirror distance - (constant)
$\theta$ = angle between principal ray and platen normal
$w$ = angular velocity of reflector Since the photoreceptor 22 is moving at a constant angular velocity however, it is required that the scan velocity $V_o$ also be constant so that the object scan and resulting image composition on the photoreceptor are in synchronism. For $V_o$ to be constant, it is necessary for the mirror angular velocity $w$ to be variable. The following relationship which is a transposition of equation 1, expresses the variable angular velocity $w$ required to provide a constant scan velocity $V_o$:

$$w = (V_o \cos^2 \theta)/Y \quad (2)$$

It is now desired to provide a mechanical arrangement to effect the variable angular velocity $w$ of rotating mirror 14 in accordance with equation 2.

Figure 5:
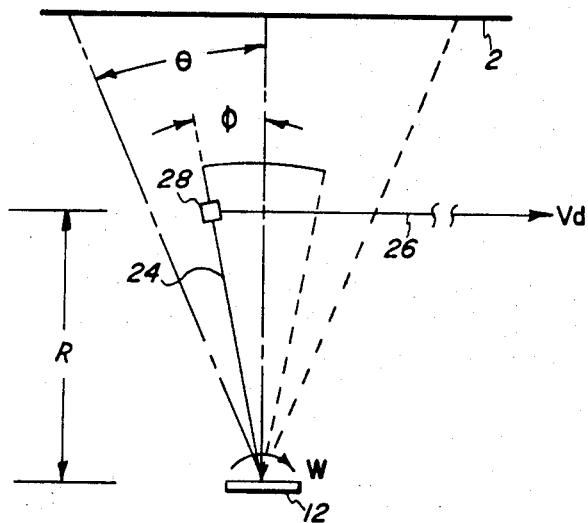
FIG. 5 is a diagram of a mechanical drive for a scanning mirror superimposed on a diagram of the optomechanical geometry of the scanning system.

Referring now to FIG. 5, the object plane is again shown in relation to lens reflector 12 which is here shown connected to a drive arm 24 by which the reflector 12 is rotated on its axis 11. Drive arm 24 is in turn connected to a suitable drive mechanism exemplified by driver rod 26 which is movable in a linear direction parallel to object plane 2 at a constant speed $V_d$. The details of the drive mechanism which imparts a constant $V_d$ to the driver 26 are not important here. Driver 26 is operatively connected to the reflector drive arm 24 by a suitable sliding connection 28 to permit relative movement of the driver 26 radially along the reflector drive arm 24. Thus, the effective drive radius of arm 24 is variable during scan in the the same way that the scan radius itself is variable during scan. To illustrate this point, the mirror drive system 24, 26 is shown in FIG. 5 superimposed on the optical outline including object plane 2 and mirror 12. The similarlity in geometry of the optical and mechanical systems is readily apparent.

With drive mechanism 26 moving at a constant velocity $V_d$, the angular velocity $w$ of lens reflector 12, as drive arm 24 is swung from one end position to the other end position of scan, is given as follows:

$$w = (V_d \cos^2 \phi)/R \quad \text{(Equation 3)}$$

wherein:
$w$ = angular velocity of driver and reflector
$V_d$ = velocity of drive mechanism
$\phi$ = angle between drive arm and normal to driver
$R$ = moment arm - driver to reflector axis (constant)
Substituting $(V_d \cos^2 \theta/R)$ from equation 3 for $w$ in equation 1, it is seen that:

$$Vo = (Y V_d \cos^2 \phi)/(R \cos^2 \theta)$$

Figure 6:
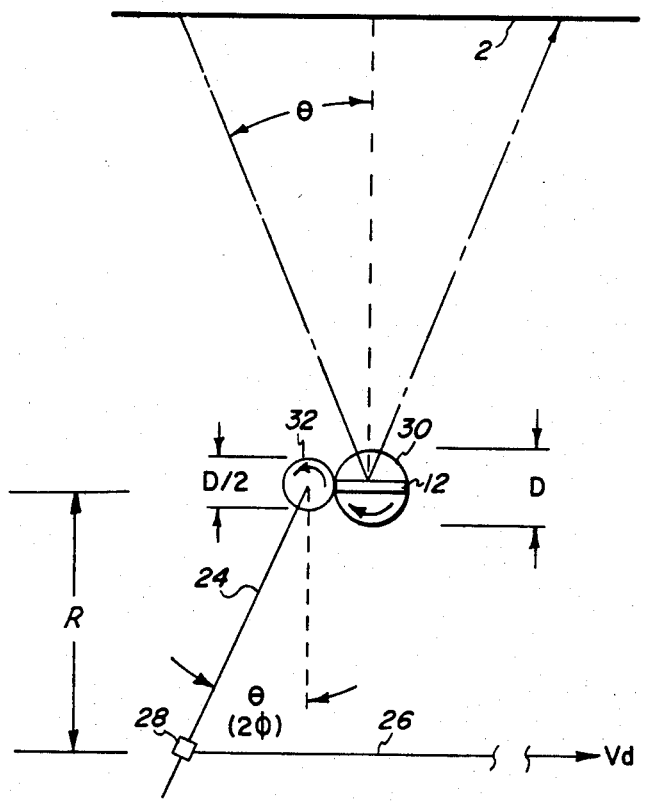
FIG. 6 is a diagram of a mechanical drive for a scanning mirror in which the driver moves through an angle equal to that of the scanned optical path.

Because of reflection at the lens reflector 12, the angle $\theta$ through which the optical path moves is twice the angle $\phi$ through which reflector 12 moves. As a result, the above relationship is not linear with the system as shown in FIG. 5 with the reflector 12 fixed to the drive arm 24. In order for the motion characteristics of the driver 26 and the scan on the platen to be the same, the relationship must be linear. Therefore the angle $\phi$ through which the driver rotates must equal the angle $\theta$ through which the principal ray of the optical system moves. This is achieved by a motion reduction between drive arm 24 and reflector 12 as exemplified in FIG. 6. Reflector 12 is mounted on a driven wheel 30 of diameter D which is in driving engagement with a drive wheel 32 of diameter D/2. Drive wheel 32 is integral with drive arm 24. It will be appreciated that as drive arm 24 rotates through an angle $2\phi$, equal to $\theta$, the reflector rotates through its required angle $\phi$, equal to $\theta/2$.

Now, substituting equation 3 in equation 1 it is seen that:

$$Vo = (Y V_d \cos^2 2\phi)/(R \cos^2 \theta) \quad (4)$$

in which the last term is unity. Thus it is clear that when the drive arm rotates through an angle equal to that of the scan ray, the relationship of $V_o$ to $V_d$ is linear and therefore their motion characteristics are the same and the system requirements are fulfilled.

To summarize, the uniform velocity of the linear motion of driver 26 effects a varying angular velocity of the mirror in accordance with equation 4, and the varying angular velocity of the mirror in turn produces a uniform optical scan velocity in accordance with equation 1.

The foregoing description of an embodiment of this invention is given by way of illustration and not of limitation. The concept and scope of the invention are limited only by the following claims and equivalents thereof which may occur to others skilled in the art.

What is claimed is:

1. A system for scanning a flat object surface with a rotating mirror at a constant scan velocity $V_o$ including:
a flat object surface,
a rotatable mirror disposed relative to said object surface to scan the same,
a mirror drive operatively connected to said mirror to impart a variable angular scan velocity $w$ to said mirror according to the following relationship:

$$w = (V_o \cos^2 \theta/Y)$$

wherein:
$w$ = Angular velocity of mirror
$V_o$ = Velocity of scan along object surface (constant)
$\theta$ = Angle at any instant between principal ray and normal to object plane
$Y$ = Normal distance from object surface to mirror axis (constant)
said mirror drive including a pivoted mirror drive arm operatively connected to said rotatable mirror, a linear drive means acting at a constant moment arm R from the pivot axis of said drive arm and operatively connected to said drive arm and slidable relative thereto so that said moment arm R is constant during movement of said drive means, said drive means being movable at a constant linear velocity $V_d$ and driving said mirror drive arm at an angular velocity $2w$ according to the following relationship:

$$2w = (V_d \cos^2 2\phi/R)$$

wherein:
$2w$ = angular velocity of mirror drive arm
$V_d$ = linear velocity of drive means (constant)
$2\phi$ = angle at any instant between mirror drive arm and its position at center of scan
$R$ = moment arm - drive means to mirror axis (constant)
and reduction means operatively connecting said mirror drive arm to said mirror by which the angular displacement of said mirror is half that of said drive arm.

* * * * *